Dec. 14, 1965 W. H. STALLINGS 3,223,128
ADJUSTABLE SAW BLADE CONTROL SYSTEM FOR END TRIMMER APPARATUS
Filed Nov. 24, 1961 2 Sheets-Sheet 1
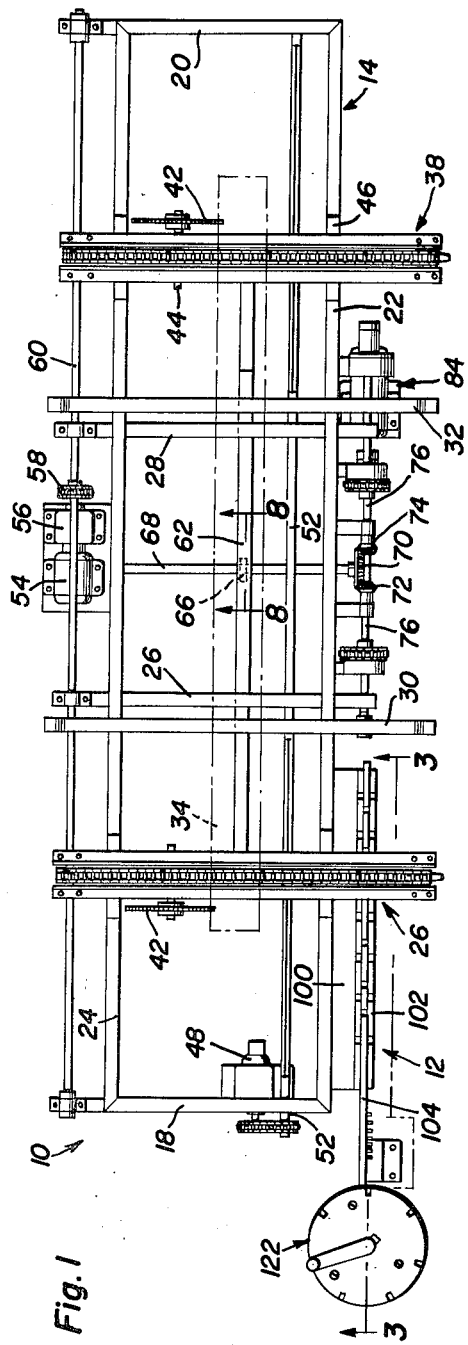
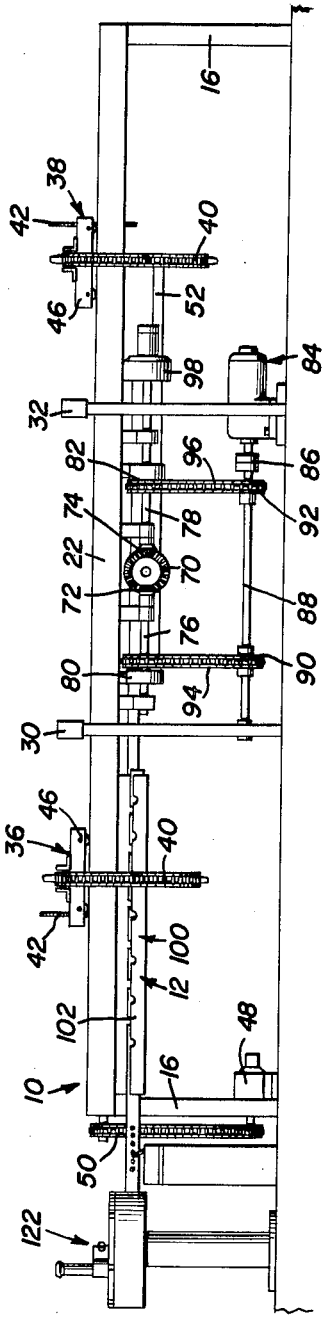
William H. Stallings
INVENTOR.

Dec. 14, 1965 W. H. STALLINGS 3,223,128
ADJUSTABLE SAW BLADE CONTROL SYSTEM FOR END TRIMMER APPARATUS
Filed Nov. 24, 1961 2 Sheets-Sheet 2
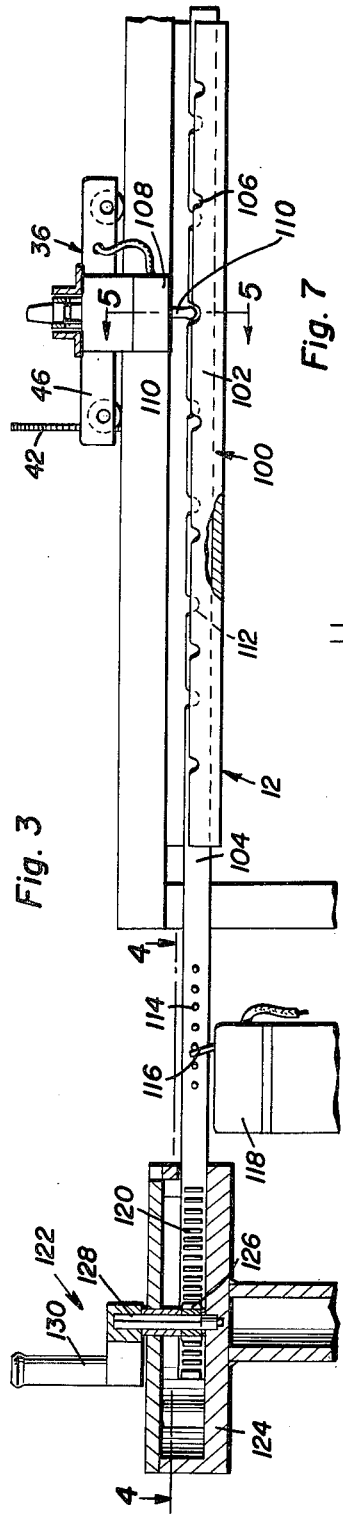
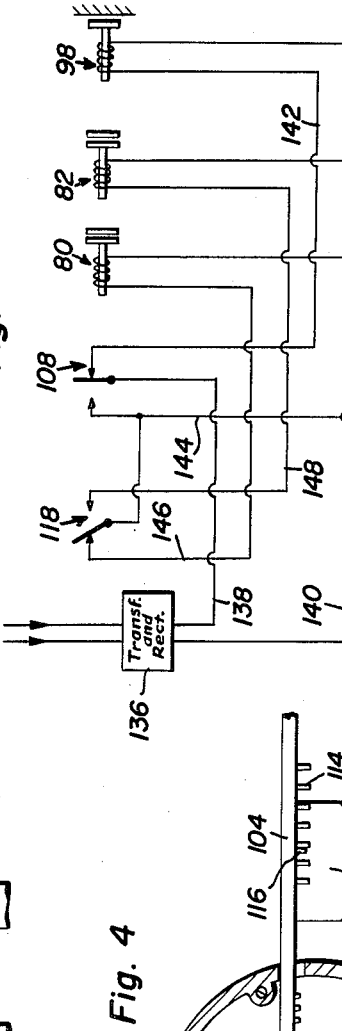
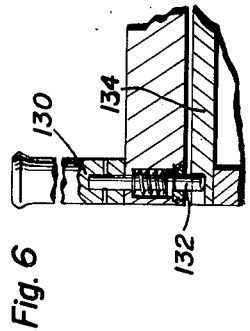
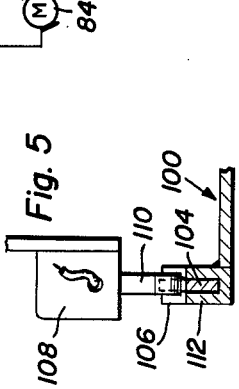
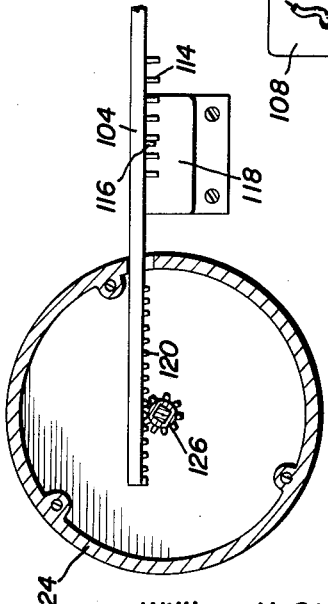
William H. Stallings
INVENTOR.

United States Patent Office 3,223,128
Patented Dec. 14, 1965

3,223,128
ADJUSTABLE SAW BLADE CONTROL SYSTEM
FOR END TRIMMER APPARATUS
William H. Stallings, Rte. 4, Box 96, Louisburg, N.C.
Filed Nov. 24, 1961, Ser. No. 154,784
7 Claims. (Cl. 143—37)

This invention relates to apparatus for trimming the ends off lumber and more particularly to a position selecting mechanism for automatically positioning the end trimmer saw assemblies at selected predetermined positions.

A primary object of this invention is to provide a position selecting mechanism for end trimming apparatus capable of repositioning the end saw assemblies of the apparatus in fixed poistions predetermined by the setting of a manual selector occupying a relatively small area and involving a minimum of parts.

Another object of this invention is to provide a position selector mechanism capable of controlling the movement of end saw assemblies or the like so as to reposition said assemblies at a predetermined position in an accurate manner.

In accordance witn the foregoing objects the position selector mechanism of the present invention may be installed for use in association with any suitable type of lumber trimmer which involves a pair of lumber guide and saw assemblies that are spaced apart a preselected distance in order to trim the ends of lumber passing thereover. Accordingly, the saw assemblies are provided with a reversing drive mechanism and brake mechanism for respectively repositioning the saw assemblies and holding them fixed in a preselected position. Control over the reversing drive mechanism and brake mechanism is effected through the novel position selector which involves the mounting of a fixed positioning bar or rack having a plurality of spaced notches thereon to define the spaced positions of one of the saw assemblies. A position control limit switch is therefore mounted upon the aforementioned saw assembly for cooperation with the spaced notches on the position defining bar. A selector bar is, however, slidably mounted with respect to the position defining bar and is also provided with notches that are spaced apart a distance less than the notches on the fixed position defining bar so that only one of the position defining notches will be aligned with a notch on the selector bar for exposure in any aligned position of the selector bar. Accordingly, the cooperating position control switch mounted on the positioned saw assembly, will be actuated when aligned with only a selected notch exposed on the position defining bar. When so aligned, the limit switch mounted on the saw assembly will be operative to engage the brake mechanism to hold the saw assembly in its position. Displacement of the selector bar will, however, misalign the notches to displace the limit switch on the saw assembly so as to release the brake mechanism and operatively condition a control circuit to effect powered repositioning movement of the saw assemblies. The selector bar may therefore be connected to a selector handle having an appropriate position defining detent mechanism for incremental displacement of the selector bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of an end trimmer apparatus with the position selector mechanism of the present invention installed thereon;

FIGURE 2 is a side elevational view of the apparatus illustrated in FIGURE 1;

FIGURE 3 is a partial sectional view taken substantially through a plane indicated by section line 3—3 in FIGURE 1;

FIGURE 4 is a partial sectional view taken substantially through a plane indicated by section line 4—4 in FIGURE 3;

FIGURE 5 is a partial sectional view taken through a plane indicated by section line 5—5 in FIGURE 3;

FIGURE 6 is a partial broken sectional view of the selector controller handle;

FIGURE 7 is a circuit diagram of the control system associated with the position selector; and FIGURE 8 (Sheet 1) is a partial sectional view taken through a plane indicated by section line 8—8 in FIGURE 1.

Referring now to the drawings in detail, FIGURES 1 and 2 illustrate one form of end trimmer apparatus generally referred to by reference numeral 10. Although a specific trimmer apparatus is described, it will be appreciated that the position selector generally referred to by reference numeral 12 may be mounted on other forms of trimmer apparatus. The exemplary trimmer apparatus 10 therefore includes a frame assembly generally referred to by reference numeral 14 supported in spaced relation above the ground by means of post members 16. The frame assembly includes cross frame members 18 and 20 at opposite ends thereof to which a pair of parallel side frame track members 26 and 28 may also be provided. Also mounted centrally of the frame assembly 14 are a pair of lumber guide support members 30 and 32 over which lumber 34 as shown by dotted lines in FIGURE 1 may move. Inasmuch as the apparatus 10 is operative to trim the ends of the lumber 34 in order to produce boards of a predetermined length, the side frame track members 22 and 24 slidably mount a pair of guide saw carriage assemblies 36 and 38. Each of the assemblies 36 and 38 therefore mounts lumber conveying sprocket chains 40 for movement of the lumber 34 across the assemblies 36 and 48 into the path of a rotary saw blade 42 mounted on an arbor 44 suitably supported by the assembly 36 or 38. The saw blades 42 accordingly project upwardly above the assemblies 36 and 38 for cutting the lumber 34 at the ends thereof. It will also be observed that each of the assemblies 36 and 38 is slidably mounted for movement along the track frame members 22 and 24 by means of roller guide assemblies 46. It will therefore be appreciated that the exact length of the lumber being trimmed may be determined by the relative spacing between the assemblies 36 and 38.

The trimmer apparatus 10 is also provided with a saw blade drive motor 48 at one end of the frame assembly which motor 48 is drivingly connected through sprocket gearing 50 to a power shaft 52 that extends longitudinally of the frame assembly and through the guide and saw assemblies 36 and 38 whereby the shaft 52 is drivingly connected to the saw arbors 44 rotatably mounted on the assemblies 36 and 38. Accordingly, energization of the motor 48 will effect rotation of the saw blades 42. Also, in order to effect feeding of the lumber 34 into the rotating saw blades 42 for trimming thereof, a lumber feed motor 54 is provided and is drivingly connected through a gear reducer 56 and sprocket gearing 58 to a power feed shaft 60 suitably journaled at spaced locations by means of the frame assembly and extending through the guide and saw assemblies 36 and 38 for driving connection to the lumber feeding sprocket chains 40. Accordingly, lumber placed at the forward end of the assemblies 36 and 38 will be fed toward the rotating saw blades 42 for trimming thereof.

In order to position the assemblies 36 and 38 toward or away from each other, a pair of positioning rack gear members 62 and 64 are respectively connected to the assemblies 36 and 38. The rack gear members 62 and 64 mesh with a positioning gear 66, as shown in FIGURE 8, fixed to a shaft 68 suitably journaled by the frame assembly and extending centrally and transversely thereof. Rotation of the shaft 68 and the gear 66 in one direction will accordingly displace the rack members 62 and 64 in one direction or the other in order to move the assemblies 36 and 38 toward or away from each other. The shaft 68 is therefore connected at its forward end to a bevel gear 70. In mesh with the bevel gear 70 are side bevel gears 72 and 74 respectively connected to the shafts 76 and 78. In this manner, the bevel gears 72 and 74 are drivingly connected through electromagnetically energized clutch mechanism 80 and 82 to a carriage positioning drive 84 in order to rotate the bevel gear 70 in one direction or the other by powering either the side bevel gear 72 or the bevel gear 74 dependent upon which of the clutch mechanisms is energized. Gear motor 84 is thereby provided with a coupling 86 to a power shaft 88 having a pair of sprockets 90 and 92 fixed thereto each being connected by chain 94 or 96 to a sprocket on the clutch mechanism 80 or 82. One of the bevel gear shafts 78 is also connected to an electromagnetically controlled brake mechanism 98 by means of which braking of the bevel gear 74 will be operative to also hold the shaft 68 stationary and through the rack gear members 62 and 64 lock the carriage assemblies 36 and 38 in position. It will therefore be apparent, that the positioning of the assemblies 36 and 38 will be effected by energization of gear motor 84 and one of the clutch mechanisms 80 or 82 in order to effect movement of the carriage assemblies 36 and 38 toward or away from each other. When the carriage assemblies have reached a preselected position, the energized clutch mechanism will be deenergized and the brake mechanism 98 engaged in order to hold said carriage assemblies in the preselected position. The carriage positioning drive 84 may be at the same time be deenergized.

In order to control the positioning of the carriage assemblies 36 and 38 through the clutch mechanisms 80 and 82 and brake mechanism 98, as hereinbefore mentioned, the position selector mechanism 12 is mounted adjacent one end of the frame assembly for cooperation with one of the assemblies 36. As more clearly seen in FIGURES 1, 2 and 3, the selector positioning control mechanism includes a positioning bar assembly 100 which is fixedly mounted on the frame assembly for the purpose of defining a plurality of spaced trimming positions for the carriage assembly 36. The positioning bar assembly 100 accordingly includes a pair of guide members 102 which slidably receive therebetween a selector bar 104 (FIGURES 1 and 5). The positioning guide members 102 are provided on the upper edge portions with a plurality of equally spaced position defining notch formations 106, 7 being illustrated in the present example. Accordingly, the notches 106 define spaced trimming positions on the frame assembly with respect to which the carriage assembly 36 is repositioned.

The carriage assembly 36 is therefore provided adjacent one end and depending therebelow, with a two position limit switch assembly 108. The switch assembly 108 accordingly includes a downwardly projecting switch actuating arm 110 (FIGURE 3) that is received within a notch 106 when aligned with an exposing notch formation 112 formed on an upper edge portion of the selector bar 104. It will be observed from FIGURE 3 in particular, that the notch formations 112 are spaced apart a distance less than the spacing between the notches 106 on the position defining assembly 100. Accordingly, the selector bar 104 may be displaced from one aligned position to another with respect to the assembly 100 in order to expose or render one of the position defining notches 106 operative to receive the actuator member 110 of the switch assembly 108. The spacing of the notches 112 is therefore arranged so that a total displacement of the selector bar 104 by a distance equal to the spacing between two of the position defining notches 106 will be sufficient to cause alignment with each of the more widely spaced notches 106 for a different aligned position of the selector bar 104 with respect to the position defining assembly 100. It will therefore be appreciated that the selector bar 104 need only be displaced a relatively short distance in order to select one of the more widely spaced trimming positions as defined by the notches 106. It will also be apparent that displacement of the selector bar 104 in order to select a different notch 106 for alignment with a notch 112 will cause displacement of the switch arm 110 of the switch assembly 108. The switch assembly 108 as will be hereafter explained, will then be effective to release the brake mechanism which has held the carriage assemblies in their preselected position so that the reversing drive clutch mechanism may effect movement of the carriage assemblies in one direction or another.

The selector bar 104 is therefore provided with a plurality of closely spaced abutments 114 equal in number to the number of alignment positions of the selector bar 104 with respect to the position defining assembly 100 corresponding also to the different trimming positions of the carriage assemblies. The abutments 114 constitute switch actuating means that cooperate with the projecting member 116 of a directional positioning micro-switch assembly 118 which controls energization of the clutch mechanisms 80 and 82 for directionally imparting movement to the carriage assemblies 36 and 38 for repositioning thereof.

One end of the selector bar 104 is also provided with rack gear teeth 120 for imparting selective movement to the selector bar by means of a manually controlled assembly generally referred to by reference numeral 122. The selector assembly, therefore, includes a housing assembly 124 mounted in spaced relation above the ground for receiving the rack gear tooth end 120 of the selector bar 104 for meshing engagement with a pinion gear 126 rotatably mounted in the housing 124. The gear is rotatably fixed to a shaft member 128 to which a controller crank handle 130 is connected for imparting angular movement to the gear 126 to displace the selector bar 104. As more clearly seen in FIGURE 6, the controller handle 130 may be provided with a detent 132 (FIGURE 6) which yieldably cooperates with notches on a detent plate 134 fixed to the housing 124. Accordingly, the crank controller handle 130 may be moved to a location determined by the detent 132 in order to properly displace the selector bar 104 from one aligned position to another.

Referring now to FIGURE 7 in particular, it will be observed that the position selector mechanism 12 is operative through the switch assemblies 108 and 118 and an electrical circuit wired to properly energize and deenergize the reversing clutch mechanisms 80 and 82 and the brake mechanism 98. Accordingly, power from any suitable A.C. source may be supplied to a transformer rectifier unit 136 for suplying D.C. current to a power line 138 and a return line 140. The power line 138 is connected by the switch assembly 108 to the brake mechanism 98 through the line 142 when the switch assembly 108 is in a position determined by the switch arm 110 being received within aligned notches 106 and 112 of the position defining assembly 100 and selector bar 104. Accordingly, a circuit is completed through the brake energizing coil of the brake mechanism 98 to hold the carriage assemblies fixed by virtue of the braking of the shaft 76, bevel gear 74, bevel gear 70 and shaft 68 connected thereto. At the same time, the clutch mechanisms 80 and 82 will be deenergized. When, however, the selector bar 104 is displaced from its aligned position, the switch assembly 108 will be actuated to its other position whereupon the power line 138 is connected to the line 144 to energize the repositioning motor 84 by closing a circuit therethrough and also supplying current through switch assembly 118 to either the line 146 or the line 148 depending upon the direction in which the switch arm 116 of the switch assembly 118 is displaced by movement of the selector bar 104. It will therefore be apparent that the power line 138 being disconnected from the line 142 to deenergize the brake mechanism and at the same time supply current to the switch 118 for energizing either the clutch mechanism 80 or the clutch mechanism 82 depending upon the direction of displacement of the switch assembly 118. The simultaneously energized reduction gear motor 84 will therefore cause movement of the carriage assemblies toward or away from each other. When the carriage assembly 36 reaches the new position in which the notches 106 and 112 are aligned, the switch arm 110 thereof will be received therein to actuate the switch assembly 108 to its brake energizing position as illustrated in FIGURE 7. Accordingly, the circuit to the clutch mechanism 80 or 82 will be broken and the carriage assemblies held fixed in position by the brake mechanism 98.

In view of the foregoing, operation and use of the positioning selector device of the present invention in connection with lumber trimming apparatus will be apparent. It will therefore be appreciated that the selector positioning device is adaptable to trimmer devices of all types involving a movable carriage the position of which one desires to preselect. It will further be appreciated that the position selector device will be relatively small in dimension, simple in arrangement and installation and yet operate effectively to achieve its purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A position selector for lumber trimming apparatus having a movable saw assembly comprising, position control means mounted on said movable saw assembly, fixedly mounted position defining means having position defining formations to stop repositioning movement of the movable saw assembly between position limits at a plurality of predetermined spaced trimming positions, selectively operable means having alignment formations and movably mounted by the position defining means for displacement to a plurality of alignment positions between selector limits substantially closer than the said position limits to selectively align one of said alignment formations with one of said position defining formations at only one of said spaced trimming positions and directional control means engageable by one of said alignment formations to directionally control and start repositioning movement of the movable saw assembly in response to displacement of the selectively operable means between said alignment positions thereof.

2. The combination of claim 1, wherein said selectively operable means comprising a slide member displaceable between said selector limits a distance equal to the spacing between two adjacent spaced trimming positions, said alignment formations being formed on said slide member for alignment with the position defining formations at said alignment positions for exposing one of said position defining formations, and spaced abutment means mounted on the slide member for actuation of said directional control means in one direction or the other upon displacement of the slide member from an alignment position.

3. A position selector for lumber trimming apparatus having a movable saw assembly comprising, position control means mounted on said movable saw assembly, position defining means engageable by said position control means and rendered operative to stop reposition movement of the movable saw assembly between limits at a plurality of predetermined spaced trimming positions relative to the position defining means, selectively operable means movably mounted by the position defining means for displacement to a plurality of alignment positions relative thereto between selector limits substantially closer than the repositioning movement limits of the movable saw assembly to selectively render said position defining means operative at only one of said trimming positions and directional control means engageable by the selectively operable means and operative in response to displacement thereof from an alignment position to directionally control and start repositioning movement of the movable saw assembly, said position defining means comprising a fixed guide member having a plurality of equally spaced position defining formations, said selectively operable means comprising a slide member displaceable a total distance equal to the spacing between said trimming positions, edge aligning formations formed on said slide member and spaced apart a distance less than the spacing between said trimming positions for alignment with the position defining formations at said alignment positions for exposing one of said position defining formations, and spaced abutment means mounted on the slide member for actuation of said directional control means in one direction or the other upon displacement of the slide member from an alignment position, said position control means comprising a two-position limit switch having a brake engaging position to hold the movable saw assembly fixed in one of said spaced trimming positions and a drive conditioning position for effecting repositioning movement of the movable saw assembly in a direction determined by the directional control means.

4. The combination of claim 3, wherein said directional control means comprises a reversing micro-switch rendered operative by the position control means to effect repositioning movement of the movable saw assembly in one direction or the other.

5. A position selector for lumber trimming apparatus having a movable saw assembly comprising, position control means mounted on said movable saw assembly, position defining means engageable by said position control means and rendered operative to stop repositioning movement of the movable saw assembly between limits at a plurality of predetermined spaced trimming positions relative to the position defining means, selectively operable means movably mounted by the position defining means for displacement to a plurality of alignment positions relative thereto between selector limits substantially closer than the repositioning movement limits of the movable saw assembly to selectively render said position defining means operative at only one of said trimming positions and directional control means engageable by the selectively operable means and operative in response to displacement thereof from an alignment position to directionally control and start repositioning movement of the movable saw assembly, said position control means comprising a two-position limit switch having a brake engaging position to hold the movable saw assembly fixed in one of said spaced trimming positions and a drive conditioning position for effecting repositioning movement of the movable saw assembly in a direction determined by the directional control means.

6. The combination of claim 5 wherein said directional control means comprises a reversing micro-switch rendered operative by the position control means to effect repositioning movement of the movable saw assembly in one direction or the other.

7. In an end trimming saw machine, the combination of a power operated carriage, a fixed rack member having a plurality of equally spaced position notches defining preselected positions at which powered movement of the carriage may be stopped and a position selecting control assembly for rendering one of said position notches, operative to stop powered movement of the carriage comprising; a displaceable member having a plurality of equally spaced alignment notches therein equal in number to said position notches and spaced apart a distance substantially less than the spacing between said position notches on the fixed rack member, means guidingly mounting said displaceable member on the fixed rack member for aligning each of said alignment notches with each of said position notches respectively one at a time by incremental displacement of the displaceable member, selector means operatively connected to said displaceable member for imparting said incremental displacement thereto between limits spaced a distance substantially equal to the spacing between said position notches on the rack member for rendering one of said preselected position notches operative, control means mounted on the carriage and operative in response to misalignment of the position and alignment notches to impart powered movement to the carriage toward the preselected position rendered operative by said incremental displacement of the displaceable member, and stop means operatively connected to the carriage and the control means to stop said powered movement of the carriage at the preselected position rendered operative in response to alignment of the position and alignment notches on the rack member and the displaceable member respectively.

References Cited by the Examiner
UNITED STATES PATENTS

| | | | |
|---|---|---|---|
| 431,483 | 7/1890 | Roe | 143—37 |
| 674,997 | 5/1891 | Christensen | 143—37.2 |
| 504,231 | 8/1893 | McIntire et al. | 143—37 |
| 1,389,195 | 8/1921 | Harr | 74—483 |
| 1,529,640 | 3/1925 | Hagmaier | 143—37.2 |
| 2,348,141 | 5/1944 | Luhn. | |
| 2,803,273 | 8/1957 | Ramsey et al. | 143—37.2 |
| 2,827,933 | 3/1958 | Rawson | 143—37.2 |
| 2,898,337 | 7/1959 | Moring | 74—483 |

LESTER M. SWINGLE, *Primary Examiner.*

WALTER A. SCHEEL, WILLIAM W. DYER, Jr.,
*Examiners.*